United States Patent
Savir et al.

(10) Patent No.: US 10,733,514 B1
(45) Date of Patent: Aug. 4, 2020

(54) METHODS AND APPARATUS FOR MULTI-SITE TIME SERIES DATA ANALYSIS

(71) Applicant: EMC IP Holding Company LLC, Hopkinton, MA (US)

(72) Inventors: Amihai Savir, Sansana (IL); Nimrod Milo, Gedera (IL); Oshry Ben-Harush, Kibutz Galon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

(21) Appl. No.: 15/282,092

(22) Filed: Sep. 30, 2016

Related U.S. Application Data (63) Continuation-in-part of application No. 14/980,479, filed on Dec. 28, 2015.

(51) Int. Cl.
| | | |
|---|---|---|
| *G06F 11/00* | (2006.01) | |
| *G06N 5/04* | (2006.01) | |
| *G06F 11/34* | (2006.01) | |
| *G06F 11/30* | (2006.01) | |
| *G06N 20/00* | (2019.01) | |

(52) U.S. Cl.
CPC ............ *G06N 5/04* (2013.01); *G06F 11/3006* (2013.01); *G06F 11/3452* (2013.01); *G06N 20/00* (2019.01)

(58) Field of Classification Search
CPC .......................... G06F 11/3006; G06F 11/3452
See application file for complete search history.

(56) References Cited

U.S. PATENT DOCUMENTS

| | | | |
|---|---|---|---|
| 2009/0245109 A1* | 10/2009 | Hurley | .................. H04L 41/142 370/235 |
| 2012/0096320 A1 | 4/2012 | Caffrey | |
| 2015/0160098 A1* | 6/2015 | Noda | ................... G05B 23/024 702/35 |
| 2016/0153806 A1 | 6/2016 | Ciasulli et al. | |
| 2016/0247175 A1* | 8/2016 | Milton | .............. G06Q 30/0205 |
| 2017/0046217 A1 | 2/2017 | Shinde et al. | |

OTHER PUBLICATIONS

Bishop, Christopher, "Mixture Models and the EM Algorithm", Microsoft Research, Cambridge, 2006 Advanced Tutorial Lecture Series, CUED.
"Mixture Model", https://en.wikipedia.org/wiki/Mixture_model, downloaded on Sep. 29, 2016.

* cited by examiner

*Primary Examiner* — Katherine Lin
(74) *Attorney, Agent, or Firm* — Ryan Mason & Lewis, LLP (57) ABSTRACT

Methods and apparatus are provided for multi-site time series data analysis. An exemplary method comprises obtaining a plurality of vectors over a period of time, wherein each vector comprises a local health score from each of a plurality of distributed sites that perform operational analytics on time-series data; determining a distribution of the vectors during a training phase; and calculating a global health score for the plurality of distributed sites for a given vector during a prediction phase based on a distance of the given vector from a center of mass of the distribution. Feedback is optionally provided to individual sites, such as an indication of a local health score of an individual site relative to the global health score, and adjustments to thresholds and/or parameters used by the individual site.

20 Claims, 6 Drawing Sheets

METHODS AND APPARATUS FOR MULTI-SITE TIME SERIES DATA ANALYSIS

CROSS-REFERENCE TO RELATED APPLICATION

The present application is a continuation-in-part of U.S. patent application Ser. No. 14/980,479, filed Dec. 28, 2015, entitled "System Operational Analytics," incorporated by reference herein.

FIELD

The invention relates generally to system management techniques and, more particularly, to techniques for multi-site operational analytics of time-series data.

BACKGROUND

Large data monitoring systems (for example, in the oil and gas, manufacturing and/or air travel industries) generate a large number of metric and log data entries per second. It is challenging to perform time-series analysis of such data in real-time from a single site, and even more complex when the data sources are located in different geographic locations. Additional challenges are present when massive combinatorial time-series analytics are performed over telemetry and/or log data sources that are located in different geographic locations.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for multi-site time series data analysis.

One or more embodiments of the invention provide an architecture for analyzing high volume and high velocity telemetry and log data generated in multiple locations in parallel. The disclosed time-series operational analytics techniques employ a time-series model to describe patterns and behavioral characteristics of multiple data sources from multiple locations.

One or more embodiments of the invention preprocess data from individual sites before the data is sent to a master processor. In this manner, the compute resources needed by the master processor is reduced, and the amount of data to be sent over a network to the master processor is reduced.

In at least one embodiment, the disclosed multi-site operational analytics system generates a global health score describing a global health of all sites and shares knowledge between sites, such as system thresholds and/or parameters for local time series models. In addition, the global knowledge can be used to generate initial parameters for a time series model for a new site based on the parameters learned for existing sites. Among other benefits, the disclosed multi-site operational analytics techniques allow insights to be extracted from correlations between various sites. For example, each location can be provided with feedback assessing a local performance relative to the other sites.

Figure 1:
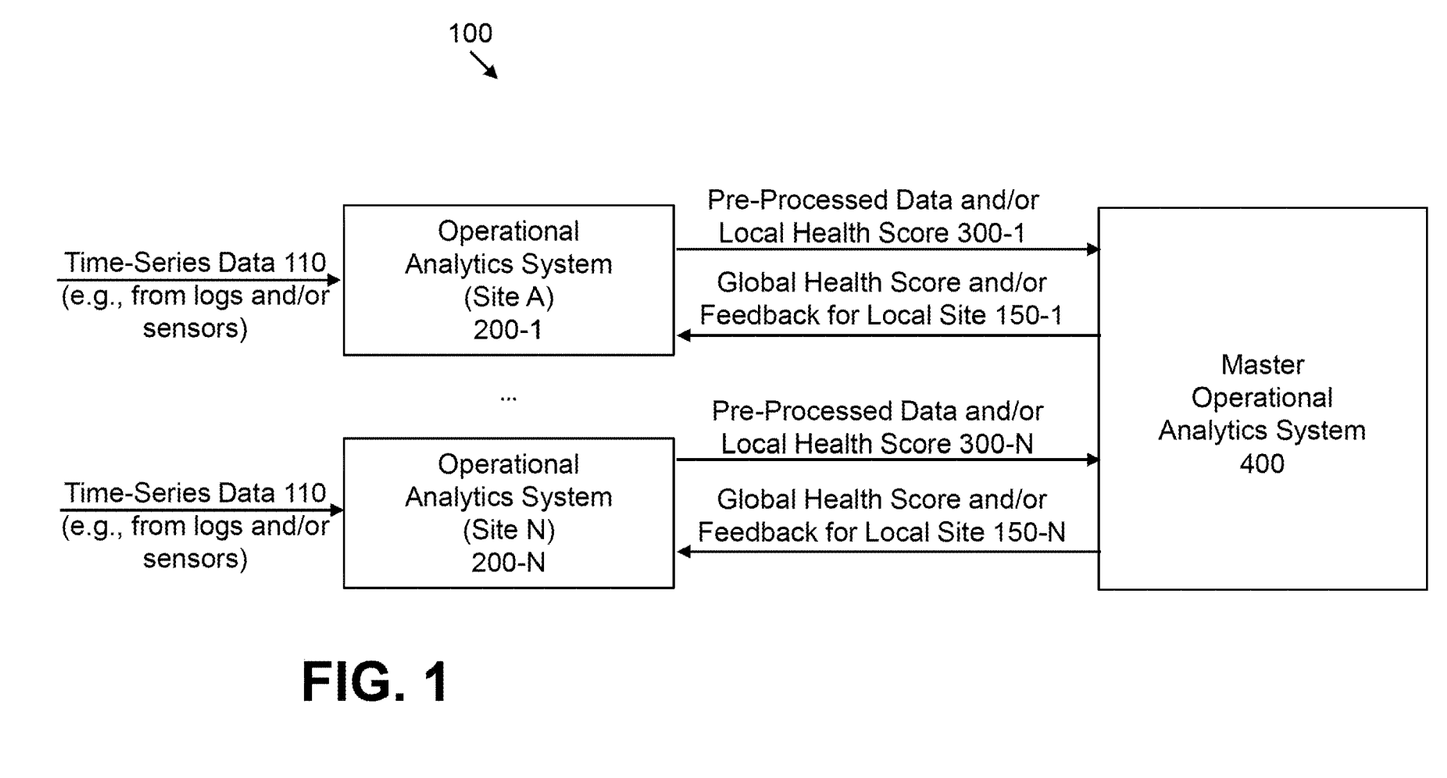
FIG. 1 illustrates a multi-site operational analytics system according to one embodiment of the invention.

FIG. 1 illustrates a multi-site operational analytics system 100 according to one embodiment of the invention. As shown in FIG. 1, the exemplary multi-site operational analytics system 100 comprises a plurality of distributed operational analytics systems 200-1 through 200-N, discussed further below in conjunction with FIG. 2, for a plurality of sites and a master operational analytics system 400, discussed further below in conjunction with FIG. 4.

Each operational analytics system 200 processes time-series data 110, such as log data and/or sensor (telemetry) data, from the local site, as discussed further below in conjunction with FIG. 2. Each operational analytics system 200 provides pre-processed data and/or a local health score 300-1 through 300-N, discussed further below in conjunction with FIG. 3, to the master operational analytics system 400.

The master operational analytics system 400 processes the pre-processed data and/or a local health score 300 and generates a global health score and/or feedback for local site 150-1 through 150-N that is provided to one or more of the individual sites.

The master operational analytics system 400 and individual operational analytics systems 200 can communicate over a network. The network is assumed to comprise a portion of a global computer network such as the Internet, although other types of networks can be part of the network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks each comprising processing devices configured to communicate using IP or other related communication protocols.

Figure 2:
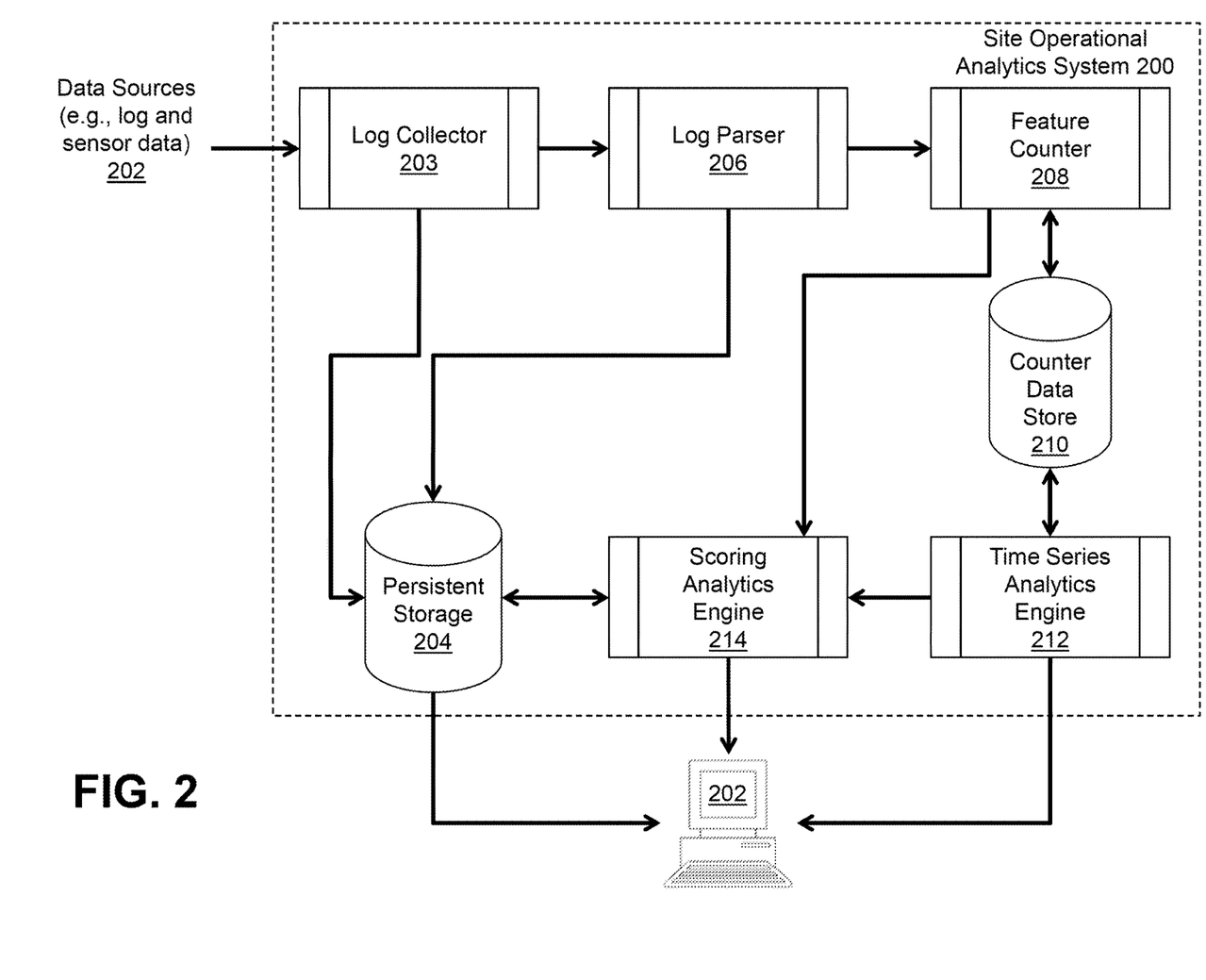
FIG. 2 illustrates an operational analytics system for a single site of FIG. 1 in further detail according to one embodiment of the invention.

FIG. 2 illustrates an operational analytics system 200 for a single site of FIG. 1 in further detail according to one embodiment of the invention. As shown in FIG. 2, the exemplary operational analytics system 200 ingests data from a plurality of data sources 202, such as log data and/or sensor data, from various log sources and telemetry, allowing the ability to apply real time analysis on the data. One or more of the data sources 202 may be implemented, for example, using a syslog-ng log management solutions, a Splunk™ operational intelligence platform, and RabbitMQ open source message broker software.

Operational analytics system 200 may process the logs and other data from data sources 202 in real time to monitor the health of the applications or system components, and/or their integrations. As discussed below, this health information may be presented to an administrator via visualization/alerting system ("VAS") 202, which in some embodiments is a general-purpose computing system.

The time series data may be received at log collector 203. In an embodiment, log collector 203 is a computer process configured to receive and or gather raw time series data. This raw time series data may be formatted, or may not be formatted at all. For example, raw time series data received from one data source 202 may be formatted differently than raw time series data received from a different data source 202. In some embodiments, log collector 203 may implement a RESTful API. Time series data may be provided as it is generated to log collector 203 using HTTP PUT or POST operations. In some embodiments, log collector 203 may include a scheduler or other coordinating process for gathering time series information. This coordinating process may indicate what information to retrieve from which data sources 202 and when. In some embodiments, log collector 203 may comprise a SpringXD™ module.

Once log collector 203 receives the raw time series data, it may be transmitted to at least one of two modules. First, the raw time series data may be transmitted to persistent storage 204. Second, the raw time series data may be transmitted to log parser 206. The time series data may be parsed using regular expressions, or any other technology capable of extracting information afrom text strings.

Persistent storage 204 may store the time series data in its raw format for future processing and/or retrieval. Storing the raw time series data may enable trends not previously known or identified in a time series model to be identified at a later point-in-time. For example, the raw time series data may be used for metrics and/or analytics once an anomaly is identified. This raw time series data may be accessed from scoring analytics engine 214, time series analytics engine 212, and/or VAS 202.

In some embodiments, persistent storage 204 may include a massively parallel processing ("MPP"), shared-nothing, unstructured database. For example, persistent storage may include multiple independent storage nodes comprising a distributed file system. This file system may be a Hadoop File System ("HDFS"), and persistent storage 204 may be a Hadoop cluster. Additionally or alternatively, the persistent storage may comprise a relational database and/or unstructured data storage such as a SAN.

Log collector 203 may also transmit the raw time series data to log parser 206. In some embodiments, log parser 206 is a software process for transforming the raw time series data into structured data. This transformation may occur in real time as the data is received from log collector 203. In an embodiment, log parser 206 uses regular expressions to identify specific features and/or attributes while parsing the data. Examples of these features include log entry types (error, info, debug, etc.), IP addresses, MAC addresses, application IDs, events, client IDs, destination IDs, timestamps, or any other type of discrete data value identifiable in the raw time series data. A system administrator may configure the regular expressions, and/or a machine-learning algorithm may generate them as the operational analytics system 200 processes the information. In an embodiment, log parser 206 may be implemented using Spring XD™ (eXtreme Data) service for data ingestion, real time analytics, batch processing, and data export, and may be integrated with or separate from log collector 203.

Once the logs are parsed, the information may be transmitted to at least two modules. First, the parsed logs may be transmitted from log parser 206 to persistent storage 204. Second, the parsed logs may be transmitted from log parser 206 to feature counter 208.

The parsed logs may be transmitted to persistent storage 204, and may be stored next to or apart from the raw time series data they were derived from. In some embodiments, features identified by log parser 206 may be associated with their locations in the raw time series data on persistent storage 204. This may assist an administrator or process interested in the feature to quickly identify the relevant raw time series data.

The parsed logs may also be transmitted to feature counter 208. This transmission may occur before, after, or in parallel with transmitting the parsed logs to persistent storage 204. Feature counter 208 may comprise a software process for tracking features received from log parser 206. Each feature may be associated with a counter, and that counter may be incremented every time a feature is identified. The counters may serve to both normalize and aggregate information from the parsed logs. For example, every time a given IP address is identified from the parsed log files, a counter associated with that IP address may be incremented. In some embodiments the counters are stored using an in-memory data structure, such as counter data store 210. Counter data store 210 may comprise a shared memory space accessible by multiple software modules, including time series analytics engine 212. The in-memory database could be, for example, a Redis™ data store.

In some instances, feature counter 208 may identify features that occur so rarely that their occurrence is likely critical. When feature counter 208 identifies a critical feature, an alert may be transmitted to scoring analytics engine 214. The alert may immediately lower the local health score of the system, as discussed below, and be raised at VAS 202. In some embodiments, the counters associated with critical features are never reset and/or may be excluded from the time series analysis discussed below. An example of a critical feature may be a complete system failure of one or more application servers.

In an embodiment, the feature counters in counter data store 210 may be accessed from time series analytics engine 212. Time series analytics 212 may analyze, manage, and derive information from the counters, such as by providing baseline models, forecasting, and event probabilities. In some embodiments, time series analytics engine 212 may reset the counters at regular intervals, such as every minute, to provide a time series. The time series and resultant information may then be used to determine an overall local system health of the site. For example, the time series may provide a baseline model of system performance, a point-in-time snapshot of the system's health, or be used to create a forecast predicting future performance.

This system health may be, for example, a normalized score and in an embodiment may enable an administrator to identify anomalies in the local system. This normalization may involve combining different forecasts, counts, residuals, anomalies, and/or other data into a single score. In some embodiments, the system health may be determined by a scoring analytics engine, such as scoring analytics engine 214.

In an embodiment, time series analytics engine 212 may create a base line time series model identifying ideal, healthy, or expected system performance. For example, the model may determine that under normal operation, application servers never receive more than one access request per minute from a given IP address. This determination may come from observing that a counter associated with the IP address in counter data store 210 rarely exceeds one during any interval. This baseline may be stored in memory or persistent storage, and may be updated over time as system characteristics and usage changes. In some embodiments, this baseline model may be created and/or modified by a system administrator. This may allow the owner of the system to define what they believe to be a healthy system.

The base line time series model could be created over a period of time and updated continuously. For example, the model may be updated after each interval or set of intervals. In some embodiments, the base line model is only updated when there were a limited number or no anomalies identified in the previous interval or set of intervals. This allows the baseline to learn and develop over time without being corrupted by anomalous activity. This process may comprise dampening training, and in an embodiment may comprise percentile filtering.

Additionally or alternatively, the time series analytics engine 212 may provide a point-in-time snapshot of health and/or performance. This point-in-time snapshot may be generated from the counters in counter data store 210, and may be based on the current interval or an aggregation of previous intervals. In some embodiments, the point-in-time snapshot may be compared to the generated baseline to identify anomalies. For example, the point-in-time snapshot may identify a particular IP address attempted to access the application servers five-hundred times in the most recent interval. If the baseline identifies that an IP address should only be accessing application servers at most once per interval, the extra accesses may be anomalies.

In some embodiments, time series analytics engine 212 may provide system forecasting. Forecasting may enable time series analytics engine 212 to estimate future values of the time series. Forecasts may be helpful for identifying future issues before they occur, or as a baseline for future point-in-time comparisons.

When the forecast identifies potential future issues, remedial actions may be taken before the issue actually manifests. For example, the forecast may identify that writes to a specific storage device are trending upwards, and therefore determine that the storage device may soon reach capacity. As a result of the forecast, future writes may be rerouted to a different, less utilized device.

The forecast may also be used to identify future anomalies. For example, the forecast may determine from the time series model and counters that a specific IP address is likely to access a given application server one-to-two times in each of next ten intervals. If time series analytics engine 212 then determines the IP address has accessed an application server a number of times outside of this range, it may be marked as an anomaly.

Forecasts may vary in length depending upon a configuration or other setting. For example, the forecasts may operate in real-time and not extend longer than a few minutes into the future. They may also be short-term, extending several hours into the future. Similarly, forecasts may be mid-term, extending several days into the future. Mid-term forecasts may be beneficial for predicting resource consumption. In some embodiments, forecasts may be long term and cover multiple months and/or years. Long term forecasts may help with strategic decisions, such as investments.

In some embodiments, different models may be used to create the forecasts. For example, the forecast may be created using an autoregressive ("AR") model. AR models relate the value of a variable in one interval to its value in a previous interval. For example, if the number of connections from a specific IP address is one for the current period, the AR model may also determine it will be one for the next period. Similarly, the forecast may be based on a moving average. The moving average model may relate the value of a variable in one interval to a rolling average of the variable in previous intervals. This may be particularly useful in identifying system trends, either up or down. For a stationary process, the forecast may also be generated using an autoregressive moving average (ARMA). Stationary processes have a "stationary" or unchanging mean and variance over time. For processes containing evidence of being non-stationary, the forecast may be generated using an autoregressive integrated moving average (ARIMA). Finally, either a holt-winter and/or a neural network may be used to provide the forecast.

Time series analytics engine 212 may use the forecasts and the current count values to identify anomalies that may otherwise be difficult to detect. For example, residuals (i.e., the difference between the forecasted count and the actual count) may be calculated for one or more features. If the residual is a substantial or unexpected number, it may indicate an anomaly. If the residual is not a substantial number (for example, relative to a predefined threshold), the system may not identify it as an anomaly. Multiple insubstantial residuals spread across a number of features, however, may actually be indicative of an anomaly. The present system may identify those anomalies, even if they are not readily apparent from a single residual.

A mixture model, such as a Gaussian Mixture Model (GMM), may identify anomalies from multiple different residuals. In some embodiments, the residuals for a plurality of features may be determined from each feature's count and the corresponding forecasted value. The mixture model may then be applied to the residuals to identify anomalies that may otherwise be undetectable by the features and/or anomalies themselves.

Once time series analytics engine 212 has identified forecasts, baselines, residuals, anomalies, or any other information, that information be presented to scoring analytics engine 214 and/or VAS 202. Additionally or alternatively, the information and/or the feature count values may be passed to persistent storage 204 for future analytics and/or time series training. Scoring analytics engine 214 may normalize the data and convert it into a human-readable numeric value. For example, a local health score may fall on a spectrum between 0 and 200. Each anomaly identified, whether it is different than a baseline or inconsistent with a forecast, may impact the score. Problematic anomalies may lower the score and beneficial anomalies may raise the score. In an embodiment, the normalization process may involve combining data received from the time series analytic engine 212, such as forecasts and residuals, and/or data retrieved from persistent storage 204. Once a local health score has been normalized from the information received from time series analytics engine 212, it may be presented to visualization/alerting system 202 and/or stored to persistent storage 204 for future training and/or analysis. A time series model may be trained from the counters. The time series model may be created using a time series analytics engine, such as time series analytics engine 212.

In some embodiments, scoring analytics engine 214 and time series analytics engine 212 may generate different scores for different components in application servers or other data sources. For example, the components may generate a health score for each individual server, hardware component, and/or application, in addition to an overall health score. These component scores may be helpful in determining which components are the cause of specific issues.

Visualization/alerting system ("VAS") 202 may perform multiple roles. In some embodiments, VAS 202 may be a general-purpose computer accessible by a system administrator. VAS 202 may present the system administrator with the score provided from scoring analytics engine 214. The administrator may be able to quickly determine the health of the system from this score. If the score falls too low, the administrator may take remedial actions. VAS 202 may also enable the administrator to research the cause of score, such as by examining the raw time series data and/or parsed logs stored on persistent storage 204. In some embodiments, VAS 202 may receive alerts or other information directly from time series analytics engine 212. Alerts may comprise information derived from the counters that require immediate attention.

In an embodiment where VAS 202 has been provided component health scores for applications, hardware, and other components associated with application servers, an administrator may be able to quickly identify root causes of anomalies. For example, if application servers have an unexpectedly low score, the administrator may examine the scores of their constituent components. Upon identifying a component with a lower than expected score, the administrator may review the logs, either raw or parsed, associated with that component to identify potential issues. VAS 202 may be implemented, for example, using one or more of the Kibana™ visualization platform, the Grafana™ visualization platform and the Tableau™ visualization platform.

For additional details regarding the operational analytics system 200 for individual sites, see, for example, U.S. patent application Ser. No. 14/980,479, filed Dec. 28, 2015, entitled "System Operational Analytics," incorporated by reference herein.

Figure 3:
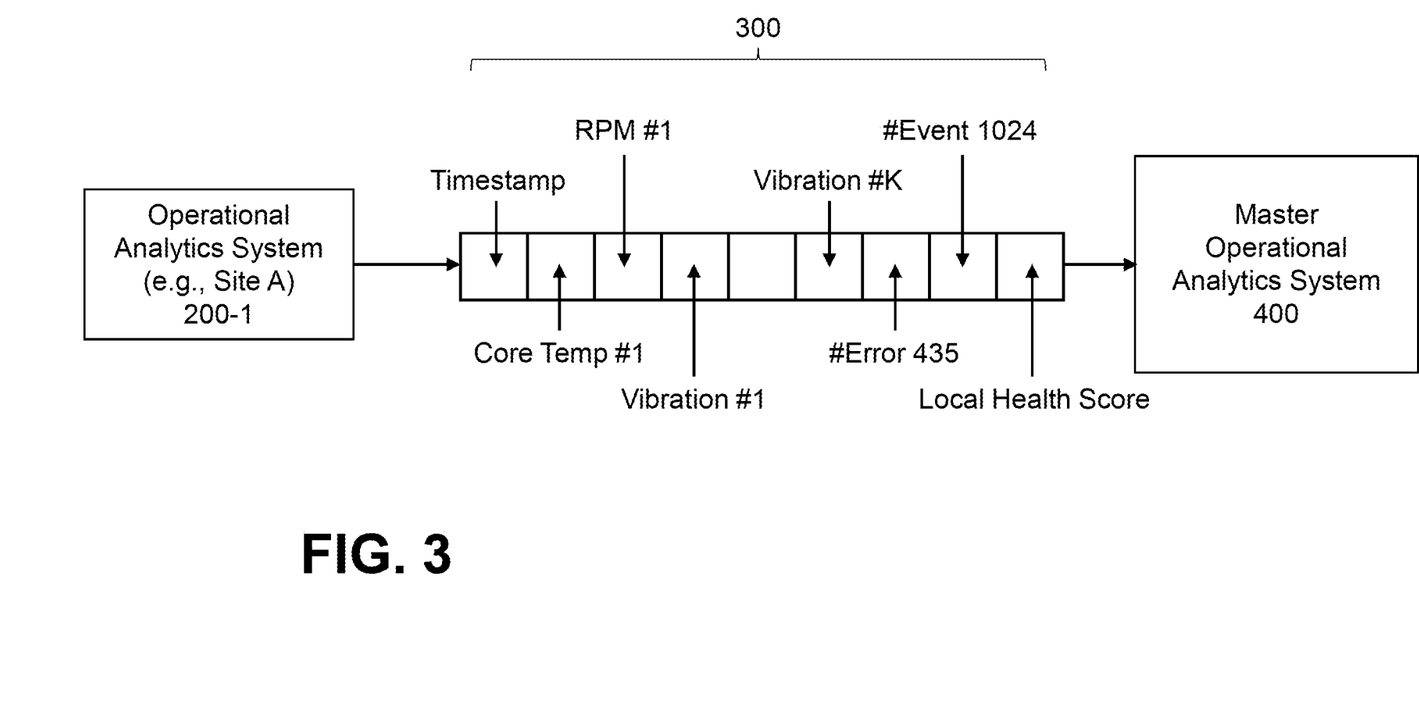
FIG. 3 illustrates an exemplary data format for pre-processed data from individual sites of FIG. 1 according to one embodiment of the invention.

FIG. 3 illustrates an exemplary data format 300 for pre-processed data from individual sites of FIG. 1 according to one embodiment of the invention. As noted above, the exemplary format 300 comprises pre-processed data and/or a local health score from the operational analytics system 200 at each individual site.

As shown in FIG. 3, the exemplary data 300 from each operational analytics system 200 at each individual site comprises raw time series data such as a time stamp, core temperature, rate-per-minute (RPM), and vibration counts; pre-processed data, such as counters for predefined errors and/or events; and a local health score for the respective site. The data 300 may comprise, for example, a vector. The processing of the data 300 is discussed further below in conjunction with FIG. 4.

Figure 4:
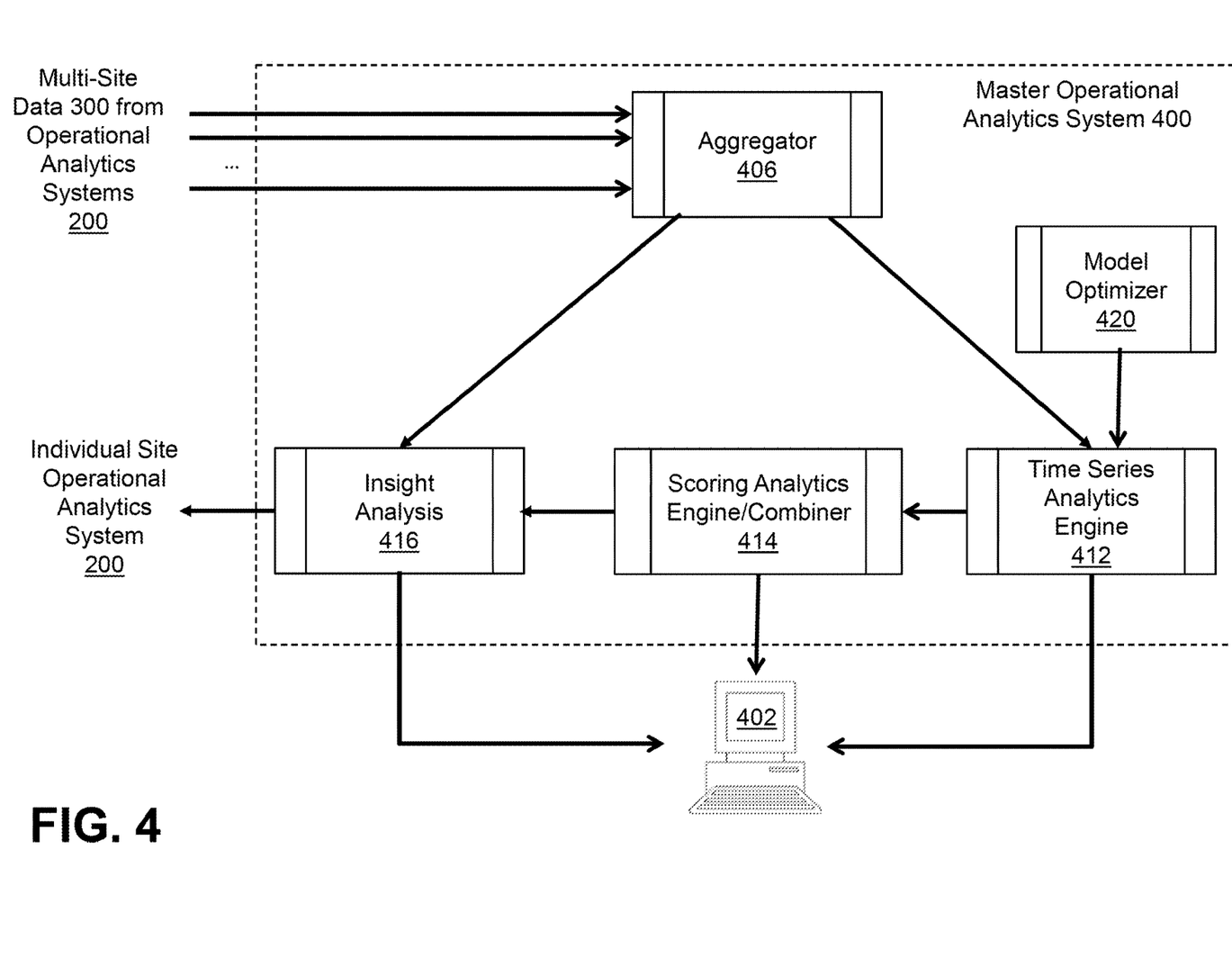
FIG. 4 illustrates the master operational analytics system of FIG. 1 in further detail according to one embodiment of the invention.

FIG. 4 illustrates the master operational analytics system 400 of FIG. 1 in further detail according to one embodiment of the invention. As shown in FIG. 4, the exemplary master operational analytics system 400 processes the data 300 received from the operational analytics system 200 of multiple sites.

The multi-site data 300 is provided to an aggregator 406 that aggregates the multi-site data 300. In this manner, the aggregator 406 receives a plurality of the vectors from the various sites over a period of time. In one or more embodiments, each vector comprises a local health score for the respective site, and optionally raw time series data and/or pre-processed data.

The aggregation that is performed by aggregator 406 can be configured on any level. For example, a given key performance indicator, such as KPI1, can be aggregated as a sum, while KPI2 will be aggregated using an average (AVG), and KPI3 will be processed as is (i.e., the output vector will have additional entries as the number of sites).

The time series analytics engine 412 and the scoring analytics engine/combiner 414 can be implemented in a similar manner as the corresponding elements discussed further below in conjunction with FIG. 2, as extended herein to provide the multi-site features and functions of the present invention.

The exemplary time series analytics engine 412 applies time series analysis method on the output of the aggregator 406, comprising combinations of KPIs and other multi-site data 300 that come from the multiple locations. In this manner, correlations between indicators can be detected that are not related directly to the same environment but can still affect each other. The exemplary time series analytics engine 412 learns the behavior of the environment as a whole and outputs a global health score accordingly. The exemplary time series analytics engine 412 can use time series methods such as Holt-Winter, ARIMA, etc.

In one or more embodiments, the exemplary time series analytics engine 412 processes the multi-site data vectors 300 during a training period to determine the distribution of the vectors. Thereafter, during a prediction phase, the exemplary time series analytics engine 412 can calculate a global health score for the multiple sites based on a given vector based on a distance of the given vector from a center of mass of the overall distribution. For example, the distance can be converted to a global health score. For large distances, the bounded global health score can be decreased. For smaller distances, the bounded global health score can be increased. If the distance exceeds a predefined threshold, an alert can optionally be generated.

In addition to the functions of the scoring analytics engine 214 (FIG. 2) described above, the scoring analytics engine/combiner 414 of FIG. 4 receives the output of the residuals for each entry in the vector 300 and computes the probability of normality of the vector. This probability can be transformed into a normalized value in the range of 0 to 100. The method for combination may be Gaussian Mixture Models (GMMs) or single-class support vector machines (SVM).

For additional details regarding the use of Gaussian Mixture Models, see, for example, U.S. patent application Ser. No. 14/980,479, filed Dec. 28, 2015, entitled "System Operational Analytics," or Christopher M. Bishop, Mixture Models and the EM Algorithm (Microsoft Research, 2006), each incorporated by reference herein.

An insight analysis module 416 learns the behavior of the individual health scores and can provide an insight about trends and patterns that can be seen in one site to other sites. The master operational analytics system 400 can send one or more of the individual sites the updated density function for the local score models and can also help to fine tune the time series models per KPI. For example, if KPH is the average core temperature of a specific sensor on each site, the local site can benefit from "knowing" the probability of temperatures in all other sites. As shown in FIG. 4, a model optimizer 420 learns model optimizations and/or parameters from past data and provides them to the time series analytics engine 412.

In one or more embodiments, the exemplary master operational analytics system 400 provides feedback to one or more individual sites. For example, each site may receive the local health site of other sites and/or their own local health score relative to the global health score. In addition to the local health scores of other sites, each site can optionally receive information on parameter tuning, if needed. This will help individual sites to improve the accuracy of local models and also show the local health score related to other sites.

In the case of new sites, the exemplary master operational analytics system 400 can optionally provide start-up parameters for all models. This will allow new sites to skip the "cold start" period that any time-series model suffers from.

Examples

One or more embodiments of the invention provide an operational analytics system that may be employed, for example, in an information technology ("IT") system. IT systems may comprise multiple independent applications operating together in real time. If an application fails, it may have a cascading effect on other applications in the system. This could degrade the system's performance as a whole, or even take the system completely offline. Maintaining the system's health, such as the system's performance, availability, responsiveness, etc., therefore includes maintaining the health of individual applications and the integrations between them.

Applications may be monitored in many ways. For example, some applications may include a monitoring tool that generates logs or reports related to the application. Should the application fail, an administrator may review the logs or reports to identify the cause of the failure. Such a monitoring mechanism, however, may be deficient for at least three reasons.

First, a given application may be dependent on the performance of another application in the system. If the other application experiences an issue, the manifestation of the issue may occur in the dependent application rather than the failing application. This may make it difficult to identify the source of the error from the dependent application's log files.

Second, the system may generate an extremely large number of log entries from multiple subsystems and/or applications. Modern systems sometimes generate more than 10,000 events per second, each of which may become one or more log entries. When the system or specific application fails, it may be difficult to identify the cause of the failure as it may be buried deep in the log files.

Third, a failure in the system may not manifest until a period of time after the failure occurred. For example, the failure of a security system may result in unauthorized access to the system. The failure may not manifest, however, until an administrator or user notices that information has been accessed. Identifying the cause of the failure may therefore be complicated as days, weeks, or months may have passed since the intrusion occurred. The tools discussed herein alleviate these and other concerns.

The system discussed herein may provide real-time operational analytics of an IT system and its subcomponents. In some embodiments, the system ingests events and/or log entries in real time, thereby providing a system health overview and/or alerts to the system administrator. The system may provide time series predictions from this log information, enabling errors, failures, or anomalies to be identified as they occur. Additionally, the system may comprise a modular framework that can be scaled as the system grows.

In some embodiments, anomalies identified by the system may comprise unexpected behavior, not necessarily bad behavior. For example, the system may be performing unexpectedly well as the result of the anomaly. It may still be beneficial to identify the anomaly so that its cause may be determined and propagated throughout the system.

In the oil and gas domain, monitoring the environment is very critical. For example, knowing about an issue in its earlier stages can save a lot of money. Although it is possible to monitor the health of one station, it is still difficult to learn from one station site, mostly due to the complexity and the high amount of data that the sensors provide.

The disclosed master operational analytics system 400 can consume metric data, such as oil pressure, frequency, usage, as well as some sensor dependent metric data from each of the sensors and combine that with unstructured textual log data. After pre-processing, the exemplary master operational analytics system 400 can combine the time-series behavior of these multiple sources of information with the information from the different sites. In one or more embodiments, only the transformed data is sent to the master operational analytics system 400 in order to provide a single health score and behavioral analysis for the entire distributed application.

In a cyber security domain, an attack that starts in one location can be moved to another site of the company. The ability to monitor time series data and to do trend analysis across sites can be used to detect an attack and even use the knowledge about the attack to alert the other sites. This can give the system administrator a heads-up to be aware of what is occurring in other sites and to get prepared with the right approach to prevent the attack from causing any further damage.

As noted above, in an IT domain, monitoring data centers is crucial. Identifying an issue in its earlier stages can reduce down time. It is possible to monitor the health of a specific application/center. It is still difficult, however, to share learned knowledge from one application or center with others, mostly due to the complexity and the high amount of data that these applications provide.

In one or more embodiments, the disclosed master operational analytics system 400 can consume metric data such as CPU, storage, memory and network consumption as well as some application dependent metric data from each of the applications and combine that with unstructured textual log data. After pre-processing, the time-series behavior of these multiple sources of information can be combined with the information of the different sites. In at least one embodiment, only the preprocessed data is sent to the master operational analytics system 400 in order to provide a single health score and behavioral analysis for the entire distributed application.

Among other benefits, the exemplary master operational analytics system 400 provides a modular, scalable time-series data analytics system, capable of analyzing telemetry data as well as unstructured (e.g., log data) from multiple sources of information of the site, with the ability to take into account trends from other locations.

CONCLUSION

One or more embodiments of the invention provide methods and apparatus for multi-site operational analytics. The foregoing applications and associated embodiments should be considered as illustrative only, and numerous other embodiments can be configured using the techniques disclosed herein, in a wide variety of different applications.

It should also be understood that the multi-site operational analytics techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed multi-site operational analytics techniques may be implemented using one or more processing platforms. One or more of the processing modules or other components may therefore each run on a computer, storage device or other processing platform element. A given such element may be viewed as an example of what is more generally referred to herein as a "processing device."

Figure 5:
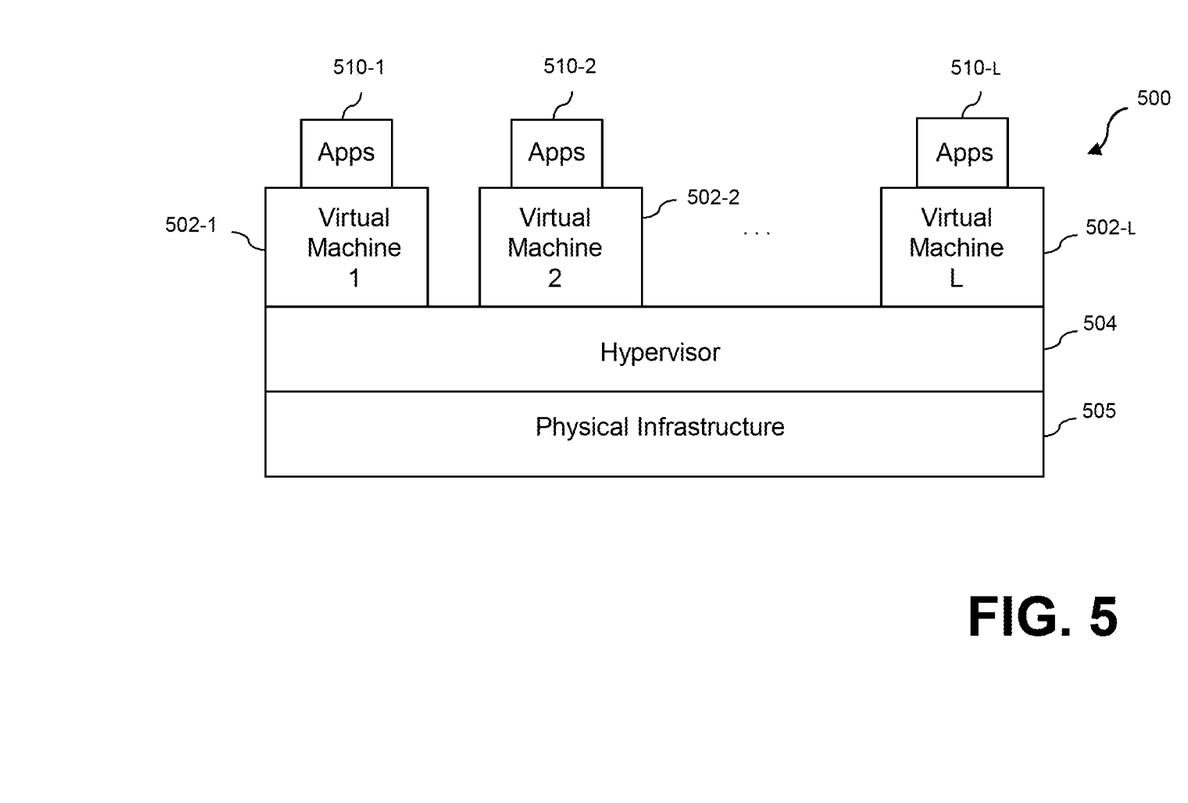
FIG. 5 illustrates an exemplary processing platform that may be used to implement at least a portion of one or more embodiments of the invention comprising a cloud infrastructure.

Referring now to FIG. 5, one possible processing platform that may be used to implement at least a portion of one or more embodiments of the invention comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine.

An example of a commercially available hypervisor platform that may be used to implement hypervisor 504 and possibly other portions of the system in one or more embodiments of the invention is the VMware® vSphere™ which may have an associated virtual infrastructure management system, such as the VMware® vCenter. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 6:
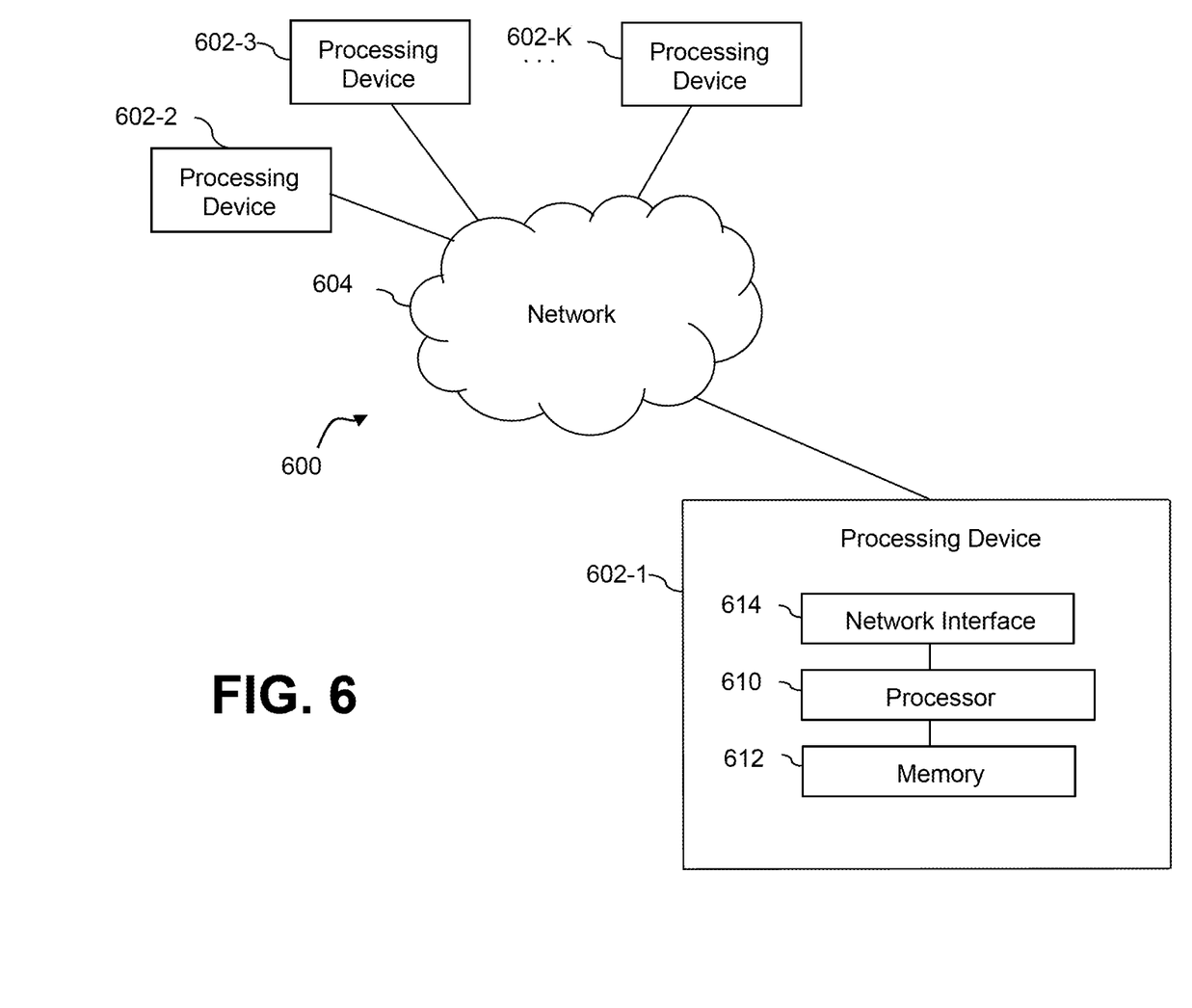
FIG. 6 illustrates another exemplary processing platform that may be used to implement at least a portion of one or more embodiments of the invention.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "computer program product" having executable computer program code embodied therein, may comprise random access memory (RAM), read only memory (ROM) or other types of memory, in any combination.

Also included in the processing device 602-1 is network interface circuitry 66, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:

obtaining, using at least one processing device at a central site, a plurality of vectors over a period of time from a plurality of individual sites that are distributed over multiple locations, wherein each of the vectors comprises a local health score that indicates a local health of a given one of the individual sites, and wherein the local health score is determined at the given individual site based on operational analytics on time-series data corresponding to the given individual site;

determining, using said at least one processing device, a distribution of said vectors during a training phase;

calculating, using said at least one processing device, a global health score for said plurality of individual sites for a given vector during a prediction phase based on a distance of said given vector from a center of mass of said distribution;

adjusting one or more parameters employed by said plurality of individual sites to improve an accuracy of one or more models employed by at least one of said individual sites; and providing the at least one of said individual sites with one or more of an adjusted threshold and an adjusted parameter to be used by said at least one individual site.

2. The method of claim 1, further comprising the step of providing feedback to at least one of said individual sites indicating said local health score of said at least one individual site relative to said global health score.

3. The method of claim 1, wherein the adjusting substantially optimizes the one or more parameters employed by said plurality of individual sites.

4. The method of claim 1, further comprising the step of obtaining one or more of metric data values and pre-processed data values from said plurality of individual sites.

5. The method of claim 4, further comprising the step of providing at least one new site with an initial set of parameters based on one or more parameters employed by one or more of said plurality of individual sites.

6. The method of claim 4, further comprising the step of aggregating one or more of said metric data values and said pre-processed data values obtained from said plurality of individual sites.

7. The method of claim 4, further comprising the step of creating a forecast from a time series model, wherein the forecast identifies an expected behavior for one or more of said plurality of individual sites.

8. The method of claim 7, further comprising the step of comparing the forecast and the one or more of said metric data values and said pre-processed data values to identify a deviation.

9. A computer program product, comprising a non-transitory machine-readable storage medium having encoded therein executable code of one or more software programs, wherein the one or more software programs when executed by at least one processing device perform the following steps:

obtaining, using at least one processing device at a central site, a plurality of vectors over a period of time from a plurality of individual sites that are distributed over multiple locations, wherein each of the vectors comprises a local health score that indicates a local health of a given one of the individual sites, and wherein the local health score is determined at the given individual site based on operational analytics on time-series data correspondingo to the given individual site, determining, using said at least one processing device, a distribution of said vectors during a training phase;

calculating, using said at least one processing device, a global health score for said plurality of distributed sites for a given vector during a prediction phase based on a distance of said given vector from a center of mass of said distribution; and adjusting one or more parameters employed by said plurality of individual sites to improve an accuracy of one or more models employed by at least one of said individual sites; and providing the at least one of said individual sites with one or more of an adjusted threshold and an adjusted parameter to be used by said at least one individual site.

10. The computer program product of claim 9, further comprising the step of providing feedback to at least one of said individual sites indicating said local health score of said at least one individual site relative to said global health score.

11. The computer program product of claim 9, wherein the adjusting substantially optimizes the one or more parameters employed by said plurality of individual sites.

12. The computer program product of claim 9, further comprising the step of obtaining one or more of metric data values and pre-processed data values from said plurality of individual sites.

13. The computer program product of claim 12, further comprising the step of providing at least one new site with an initial set of parameters based on one or more parameters employed by one or more of said plurality of individual sites.

14. The computer program product of claim 12, further comprising the steps of creating a forecast from a time series model, wherein the forecast identifies an expected behavior for one or more of said plurality of individual sites and comparing the forecast and the one or more of said metric data values and said pre-processed data values to identify a deviation.

15. A system, comprising:

a memory; and at least one processing device, coupled to the memory, operative to implement the following steps:

obtaining, using at least one processing device at a central site, a plurality of vectors over a period of time from a plurality of individual sites that are distributed over multiple locations, wherein each of the vectors comprises a local health score that indicates a local health of a given one of the individual sites, and wherein the local health score is determined at the given individual site based on from operational analytics on time-series data corresponding to the given individual site, determining, using said at least one processing devicep a distribution of said vectors during a training phase;

calculating, using said at least one processing device, a global health score for said plurality of individual sites for a given vector during a prediction phase based on a distance of said given vector from a center of mass of said distribution;

adjusting one or more parameters employed by said plurality of individual sites to improve an accuracy of one or more models employed by at least one of said individual sites; and providing the at least one of said individual sites with one or more of an adjusted threshold and an adjusted parameter to be used by said at least one individual site.

16. The system of claim 15, further comprising the step of providing feedback to at least one of said individual sites indicating said local health score of said at least one individual site relative to said global health score.

17. The system of claim 15, wherein the adjusting substantially optimizes the one or more parameters employed by said plurality of individual sites.

18. The system of claim 15, further comprising the step of obtaining one or more of metric data values and pre-processed data values from said plurality of individual sites.

19. The system of claim 18, further comprising the step of providing at least one new site with an initial set of parameters based on one or more parameters employed by one or more of said plurality of individual sites.

20. The system of claim 18, further comprising the steps of creating a forecast from a time series model, wherein the forecast identifies an expected behavior for one or more of said plurality of individual sites and comparing the forecast and the one or more of said metric data values and said pre-processed data values to identify a deviation.

\* \* \* \* \*

UNITED STATES PATENT AND TRADEMARK OFFICE
CERTIFICATE OF CORRECTION

| | |
|---|---|
| PATENT NO. | : 10,733,514 B1 |
| APPLICATION NO. | : 15/282092 |
| DATED | : August 4, 2020 |
| INVENTOR(S) | : Amihai Savir et al. |

It is certified that error appears in the above-identified patent and that said Letters Patent is hereby corrected as shown below:

In the Claims

Column 14, Lines 54-55, Claim 15, replace "determining, using said at least one processing devicep a distribution of" with -- determining, using said at least one processing device, a distribution of --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*